United States Patent Office 3,761,355
Patented Sept. 25, 1973

3,761,355
COMESTIBLE, DIGESTIBLE PROTEIN FROM CELLULOSE
Clayton D. Callihan and Vadake R. Srinivasan, Baton Rouge, La., and Charles E. Dunlap, Bay St. Louis, Miss., assignors to The Louisiana State University Foundation, a non-profit corp., Baton Rouge, East Baton Rouge Parish, La.
No Drawing. Continuation-in-part of abandoned application Ser. No. 772,357, Oct. 31, 1968. This application Aug. 11, 1971, Ser. No. 171,019
Int. Cl. C12b 1/00
U.S. Cl. 195—33                                              4 Claims

ABSTRACT OF THE DISCLOSURE

Comestible, digestible protein is produced from the insoluble, to-man-undigestible carbohydrate cellulose, by subjecting the cellulose to a pretreatment to depolymerize or degrade the lignin present and then growing thereon a cellulase-elaborating microorganism which is subsequently recovered as a food product having a high content of desirable amino acids.

CROSS REFERENCE

This application is a continuation-in-part of our copending application Ser. No. 772,357 filed Oct. 31, 1968, now abandoned.

BACKGROUND OF THE INVENTION

The world is rapidly losing its ability to feed itself from the normal sources of supply. Of particular significance is the shortage of animal-type protein, which is already acute in the developing countries and could easily reach such proportions in this country within the next decade. Animal-type proteins—high polymers composed of many or all of some 22 amino acids— are essential to the diet of human beings, because certain of these amino acids are necessary for the construction and normal replacement of body cells. As the obtainment of sufficient animal protein is of utmost importance to humans, the threat of shortages therein is an understandable cause of grave concern.

On the other hand, cellulose is by far the most plentiful of all of the earth's organic raw materials. Unfortunately, however, it has no nutritional value to man and non-ruminant animals, as it is to them undigestible under normal conditions. This is one of the primary reasons why cellulose comprises a major portion of the waste materials which must be disposed of by man—another problem which threatens to reach acute proportions in the not-too-distant future.

Of the millions of different kinds of microorganisms which are at present known to exist, many contain the types of protein which comprise those amino acids essential to the diet of man. In addition, many of these microorganisms are not in any way harmful to the mammalian organism. It would therefore appear highly desirable to attempt the harvesting of such microorganisms as food or food supplements. It would appear even more highly desirable to utilize cellulose as the basis for the medium employed to grow such microorganisms.

Cellulose is composed of long chains of anhydroglucose units, or simple sugars, connected by an ether linkage through the 1 and 4 carbon atoms. Clearly these simple sugars could serve as a substrate on which microorganisms could flourish, if a practical means could be found for releasing these sugars as food. However, many obstacles have prevented the reaping of the rich rewards that could be obtained by releasing the energy available in these simple sugars. First of all, cellulose is always accompanied in nature by the high polymer lignin, which encapsulates the cellulose fibrils with a protective wall that can be penetrated only by powerful acids, alkalis, or special pulping reagents. Secondly, native cellulose occurs in a highly crystalline form, the crystal lattice of which defies penetration by almost every reagent, living organism, or active enzyme. Thirdly, the connecting linkage which joins the simple sugar units into long chains of molecules is of the beta type, i.e., every other simple sugar unit is inverted. This linkage resists normal metabolism by all but ruminant animals.

SUMMARY OF THE INVENTION

It is an object of this invention to provide a process for cultivating microorganisms as food or food supplements. It is a further object of this invention to provide a process for cultivating microorganisms as food or food supplements, wherein cellulosic materials are utilized as the substrate on which the microorganisms metabolize. It is yet another object of this invention to provide a process for cultivating microorganisms as food or food supplements, wherein unhydrolyzed cellulosic materials are utilized as the substrate on which the microorganisms metabolize. Yet another object of this invention is to provide for cultivating microorganisms as a food product which contains a high content of protein of excellent amino acid pattern. Yet another object of this invention is to obtain such cultivation at a rate fast enough to be economically feasible.

Accordingly, the present invention is a process for preparing comestible, digestible protein, which process comprises cultivating a cellulase-elaborating microorganism on cellulosic material which has been pretreated to depolymerize or degrade the lignin present. Particularly desirable results are obtained when the microorganism utilized is of the bacterial genus Cellulomonas.

These organisms readily break down the pretreated cellulose (in contrast to their very slow action on native, untreated cellulose), metabolize on the resulting products and multiply rapidly (no special extraction or purification of the simple sugars being necessary, as is always required when the cellulose has been subjected to total acid hydrolysis, for example). Such rapid action on the cellulose molecules by the microorganisms and the resulting rapid metabolism and subsequent multiplication of the microorganisms are conveniently and advantageously made possible by an alkaline treatment, which depolymerizes the protective lignin wall encapsulating the cellulose fibrils and destroys a large portion of the native crystallinity of these fibrils. The cellulose molecules are thereby rendered open to attack by 2 enzymes which the microorganisms elaborate—one which breaks the beta linkage and converts the long chains of simple sugar units into short chains composed primarily of disaccharides, and another which attacks the disaccharides and renders them digestible by the microorganism.

Utilization of this process provides a major stepping-stone in alleviating the ever-increasing shortage of animal-type protein, both in this country and abroad.

DESCRIPTION OF THE PREFERRED EMBODIMENTS

In accordance with the process of the present invention, cellulose from any source may be utilized as the starting material. Among the many available cellulosic materials which are advantageously employed are cotton linters, bagasse, rice straw, sawdust, Johnson grass, prairie grass, alfalfa meal, cottonseed hulls, corn cobs, oat straw, wheat straw, and sorghum bagasse. Waste cellulose is often preferred, since it represents a very little cost; and little preference, if any, as to the source of the cellulose is shown by the process of the present invention. Among the waste celluloses which may be advantageously employed with proper treatment are industrial cellulosic wastes such as packing materials, oversize and improperly printed books and magazines; agricultural wastes such as bagasse; and general wastes such as paper bags, newspapers, disposable diapers, etc.

The lignin in native or natural cellulose is degraded or depolymerized prior to the fermentation step. Such degrading or depolymerization may be effected by physical and/or chemical means; e.g., by treatment with acids or bases, by oxidation, etc. Thus, filter paper, Solka Floc, and the like, which have already been pretreated to degrade the lignin present, may be employed as sources of cellulose in the practice of the present invention. It is immediately apparent to those of skill in the art that the present invention finds its greatest utility in the utilization of inexpensive and even waste cellulose materials such as bagasse, urban cellulosic wastes, and the like.

In a preferred embodiment the cellulosic material is first contacted with an aqueous alkali, preferably an aqueous alkali metal hydroxide having a concentration of about 2–50 percent by weight of the alkali metal hydroxide. This contact may be effected by immersing the cellulosic material in its natural form (stalk, hull, fiber, blade, etc.) in a tank or vat containing the aqueous alkali. Preferably, however, the cellulosic material is first ground or cut or pulverized into smaller pieces in order to afford a more intimate contact between the cellulosic material and the aqueous alkali in which it is imersed. On the other hand, the aqueous alkali may be brushed on or sprayed on the cellulosic material in either its natural or comminuted form. The aqueous alkali employed may be a water solution of any of the strong alkalis readily available. Most advantageously employed are the hydroxides of the alkali metals, especially sodium hydroxide. In order to facilitate the subsequent oxidation of the cellulosic material, the aqueous alkali may contain an oxidation catalyst, of which cobalt (II) chloride is an example. Very highly efficient oxidations of the cellulosic material are achieved when the aqueous alkali contains from about 2 to about 500 parts by weight of cobalt (II) chloride per million parts by weight of the alkali employed.

After the cellulosic material has been contacted with the aqueous alkali, it is separated therefrom and placed in an oxidation oven where heat is supplied in the presence of oxygen, and the temperature of the cellulosic material allowed to reach 25–100° C. The separation of the cellulosic material from the aqueous alkali may be accomplished by any of the standard methods known in the art: e.g., filtration, decantation, centrifugation, etc. A most efficient method to employ, however, when ground cellulosic material is utilized as the starting material, is to pump the aqueous alkali-ground cellulosic material slurry onto a continuously moving screen (e.g. one made of Monel), where most of the aqueous alkali is allowed to drain off and return to the alkali tank or vat for re-use. The screen is then allowed to pass under squeeze rolls, where pressure is applied to remove any excess alkali solution remaining with the cellulosic material. This pressed cellulose is then placed in the oxidation oven, air being blown on the cellulose, in order to hasten the oxidation and hydrolysis which are occurring.

The length of time that the alkali-contacted cellulosic material is allowed to remain in the oxidation oven is not critical—times of from 1 minute to several hours and longer have been employed. Whereas the longer residence times afford a more complete consumption of the cellulose by the microorganisms in a subsequent step of the process of this invention, the shorter residence times are more economical, and are generally, therefore, more desirable.

Pretreated cellulosic material may be fed directly into the fermentor, a closed vessel or chamber provided with a draft tube and air lift to maintain vigorous agitation by the introduction of air, (or if desired a turbine mixed fermentor is employed) wherein the pH of the fermentation medium is first brought within the range of about 5 to about 9 before any microorganisms are introduced, or it may be first neutralized before entry into the fermentor. In the case of alkali-treated cellulose, such neutralization is conveniently accomplished by placing the oxidized, alkali contacted cellulose into a tank containing an aqueous solution of a fluid proton donor (such as hydrochloric or nitric acids) the amount of which is carefully adjusted to maintain the hydrogen ion concentration within the tank near neutrality. Agitation is supplied, and after neutralization has been effected (as evidenced by no change in pH), the cellulosic material is separated by standard techniques from the neutralization medium and placed into the fermentor. It is significant to note, however, that if no separation of the oxidized, alkali-treated cellulosic material from the neutralization medium were accomplished and the entire contents of the neutralization tank were placed into the fermentor, the salts present therein would not be of the nature or concentration which would result in the destruction of the vivacity of the microorganisms which are introduced in a subsequent step of the process of this invention.

The pretreated cellulosic material is next subjected to attack by cellulase-elaborating bacteria, particularly of the genus Cellulomonas, in a nutritive medium of pH 5–9 in an aerobic fermentation chamber under submerged conditions. Superior results were obtained with a particular species, whose isolation is now described.

Isolation of the preferred organisms

Rotting sugar cane stalks and the adjacent soil mixture were obtained from a sugar cane field near the Louisiana State University campus. About 1 g. of a mixture of soil and sugar cane debris was inoculated into an isolation medium consisting of a mineral salt solution supplemented with 0.1% yeast extract and a strip of filter paper. The mineral salt solution contained: NaCl, 6.0 g.; $(NH_4)_2SO_4$, 1.0 g.; $KH_2PO_4$, 0.5 g.; $K_2HPO_4$, 0.5 g.; $MgSO_4$, 0.1 g.; $CaCl_2$, 0.1 g.; and one liter of distilled water. After 3–7 days incubation at 30° C. on a reciprocal shaker, a patch of a yellow pigmented material appeared on liquid-air interface on the filter paper. As soon as the pigmented material appeared, a portion of filter paper was transferred with a sterile wire and inoculated into fresh medium. This process was repeated several times to enrich the aerobic and mesophilic cellulose utilizing organisms. The filter paper from the enriched culture was removed, macerated in a small amount of sterile water and streaked onto plates containing each of the following media: nutrient agar, carboxy methyl cellulose agar, filter paper agar (a plate of nutrient agar covered with filter paper). Representatives of the various colonies which developed on each of these media were picked and inoculated into fresh media in test tubes. Tubes showing visual degradation of filter paper were selected and alternatively transferred into liquid and solid media in order to enrich and isolate the cellulolytic organism. Isolated colonies were further purified by the terminal dilution method as follows: A culture which disintegrated the filter paper was allowed to grow to its maximum population and serial dilutions were made into fresh medium. Approximately 100 tubes of the isolation medium containing filter paper strips were inoculated with an aliquot from each of the higher dilutions. These tubes were incubated for 7–10 days and then examined for evidence of filter paper disintegration. The tubes showing disintegration of filter paper were selected and the dilution and selection procedure was repeated until a clone from a single cell was obtained which was capable of disintegrating the filter paper. The purity of the isolated culture was confirmed by the microscopic examination and colony morphology on several agar plates.

Characterization and identification

The isolated culture was subjected to diagnostic tests according to the Manual of Microbiological Methods (Manual of Microbiological Methods, Society of American Bacteriologists, McGraw-Hill Book Co., Inc., New York, 1957; p. 315 ff.) and preferred to Bergy's Manual (Breed, Murray and Smith, Bergy's Manual of Determinative Bacteriology, 7th ed., The Williams & Wilkins Co., Baltimore) for the identification of the strains.

Preparation of crude enzyme solution

The organism was grown in a liquid medium containing the basal salts mixture with a 0.005% yeast extract. After 4 days of incubation with continuous shaking, cell free filtrates were prepared by centrifugation at 5,000 r.p.m. for 20 min. at 4° C. The supernatant phase was collected and used as stock enzymes solution.

Preparation of substrates

The following substrates were obtained from various sources: filter paper (Whatman No. 1, W&R Balston Ltd.), cellobiose (Difco Laboratories, Inc.), cellulose powder (Whatman chromedia CF11, W&R Balston Ltd.), PAB-cellulose (Bio-Rad Laboratories), CM-cellulose (Carl Schleicher & Schull Co.), cotton fiber (Johnson & Johnson, New Brunswick, N.J.), paper towel (Garland, soft-knit, single folded towel, Fort Howard Paper Co.). Azo-cellulose was prepared by treating para-aminobenzoyl cellulose with sodium nitrite and coupling the diazotized cellulose with $\beta$-naphthol to form a red colored cellulose. Bagasse pith, bagasse fibers, alkali treated and untreated sorgo bagasse were provided by the Department of Chemical Engineering, Louisiana State University.

Determination of cellulolytic activity (a) Visual determination. The organism was inoculated into test tubes containing isolation medium and incubated at 30° C. The visual degradation of filter paper was checked at frequent intervals. The breakage of filter paper usually occurred at the air-liquid interface. The visual determination was used for preliminary screening test for the cellulolytic organisms.

(b) Gravimetric determination. The organism was inoculated into basal media containing a limited amount of various cellulosic substrates. After a predesignated incubation period, cultures were filtered through Gooch crucibles (Pyrex fritted, 30 ml. capacity, M porosity). The residue on the crucible containing undigested cellulose residue was washed according to the procedure of Lembeck et al. (Lembeck, W. J. and A. R. Colmer, 1967. Effect of herbicides on cellulose decomposition by *Sporocytophaga myxococcoides*. Appl. Microbiol. 15, 300–303). A control flask was prepared which contained an equal amount of substrate inoculated with a heat killed culture. The extent of decomposition of the cellulose was calculated by comparing the weight loss of the test flask to that of the control after both samples had been dried to a constant weight at 105° C.

(c) Colorimetric determination. The amount of solubilized substrate after the action of the culture or the enzyme solution was determined by the phenol-sulfuric acid method of Dubois et al. (Dubois, M., K. A. Gilles, J. K. Hamilton, P. A. Rebers and F. Smith, 1956. Colorimetric method for determination of sugars and related substances. Anal. Chem. 28, 350–356). After a predetermined incubation period, the reaction mixture was centrifuged or filtered to remove the residual insoluble substrate. Aliquots of the supernatant or filtrate were taken and the amount of solubilized substrate was determined.

Paper chromatography

The enzyme hydrolysate was passed through an ion exchange resin column (Dowex 2–X8) and the effluent was taken to dryness by evaporation. The residue was dissolved in an appropriate amount of water. About 10–20 microliters of sample were streaked on Whatman No. 1 filter paper. The sample was then developed in an ascending manner with a solvent (i-propanol:pyridine:acetic acid:water=8:8:1:4 v./v.). Satisfactory separation was obtained after 24 hours development. For detection of nonreducing sugars the method of Cifonelli et al. (Cifonelli, J. A. and J. Smith. 1954. Detection of glycosides and other carbohydrates on paper chromatography. Anal. Chem. 26, 1132–1134) was used. The paper was removed, dried and sprayed with a saturated solution of potassium meta periodate. After 6 min. the periodate chromatogram was sprayed with a benzidine solution (0.1 M benzidine in 50% aqueous alcohol:acetone:0.2 N HCl=10:2:1 v./v.). Carbohydrates were located by the appearance of colorless spots on a blue background. Reducing sugars were detected according to Stahl (Stahl, E. 1961. Dunnschicht—chromatographic. Vi. Mitteilung spurenanalyse von Zuckergemischen Auf Kieselgur G-schichten. J. Chromatography 5, 351–355) by spraying the chromatogram with an aniline phthalate solution (0.93 g. of aniline and 1.6 g. of phthalic acid dissolved in 100 ml. of butanol saturated with water) and heating for 10 min. at 120° C. Reducing sugars were visible as red, maroon, or brown spots in white background.

With conventional enrichment and plating techniques the isolation of pure cultures of cellulose utilizing organisms was extremely difficult. This is due to the lack of proper isolating solid media because of the insolubility of cellulose in aqueous media. Therefore, many attempts have been made to substitute the cellulose with some other soluble substrate, such as cellobiose and cellulose derivatives. After a series of repeated enrichments and platings on these cellulose derivative media, a relatively pure culture of a cellulose utilizing organism was obtained. However, microscopic examination revealed that the isolate consisted of at least two or three different species of bacteria which always associated together on the solid media used. Thus, it was extremely difficult to separate them by ordinary enrichment and plating techniques. A clone of single cell capable of hydrolyzing cellulose was finally obtained by applying the terminal dilution method described above. This method permitted successful separation of even a minority of species from a mixed culture by a combination of dilution and selective cultivation.

The isolated strain of cellulose utilizing organism was a small gram negative, non-motile, rod-shaped bacterium. It grew on nutrient agar, but not vigorously, and developed small bluish transparent colonies. It was catalase positive and was capable of hydrolyzing gelatin slowly and attacking cellulose. These characteristics were identical to the Bergey's description of genus Cellulomonas. All of the ten species in the genus Cellulomonas are motile except *Cellulomonas flavigena*, *Cellulomonas uda* and *Cellulomonas acidula*. The last named species is not a nitrate reducer. Therefore, only the description of the first two species fit that of the isolated strain utilizing the available information.

The isolated organism excreted cellulase into the menstruum. The activity of enzyme in the menstruum sharply increased during the early stationary phase of growth of the organism and showed a decrease on further incubation. The level of excreted total protein in the menstruum, however, increased continuously during the stationary phase of the cell growth.

The maximum enzyme activity, measured by the amount of solubilized cellulose, was observed in the pH region of 4.7 to 6.8. The optimum pH range for the growth of the organism was noted in the pH region of 6–8. A culture of this microorganism was deposited without any restriction as to accessibility at the American Type Culture Collection, whose address is 12301 Parklawn Drive, Rockville, Md. 20852. This Culture was assigned ATCC number 21399.

The above-described organism could utilize many kinds of cellulosic materials. The regenerated cellulose such as filter paper and paper towels as well as alkali treated bagasse was easily digested, while native cellulose such as cotton fiber and untreated bagasse was difficult to digest or not digest at all. Thus it is apparent that by chemical and/or physical treatment the structural features of cellulose fibers are altered so that it becomes susceptible to the enzymatic degradation. Table I shows the effectiveness of alkali treatment on the digestibility of bagasse by the organism. As the concentration of alkali and reaction time increase, the digestibility also increases proportionally. Therefore, some sort of physical or chemical pretreatment of natural cellulose is necessary for the organism to utilize it effectively.

TABLE I.—EFFECT OF ALKALI TREATMENT ON THE DIGESTIBILITY OF BAGASSE BY THE ORGANISM

| | Treatments | | Degree of digestion,[a] percent |
|---|---|---|---|
| NaOH(percent) | Temp. (° C.) | Time (min.) | |
| 2 | 80 | 30 | 44 |
| 2 | 80 | 15 | 42 |
| 2 | 100 | 15 | 43 |
| 10 | 100 | 30 | 43 |
| 10 | 25 | 90 | 35 |
| 30 | 80 | 30 | 53 |
| 30 | 100 | 15 | 59 |
| 50 | 100 | 90 | 89 |
| 50 | 25 | 90 | 79 |

[a] Degree of digestion was measured gravimetrically after five days incubation.

The essential amino acid content of the cell protein of the organism was determined and the values obtained were compared with that of FAO reference protein pattern (National Academy of Science-National Research Council, 1963. Evaluation of Protein Quality, p. 74, publication 1100. National Acadamy of Science-National Research Council, Wash., D.C.) and proteins of other plant and animal sources. The essential amino acid pattern of the cell protein compares favorably with that of FAO reference protein. The lysine content, which is deficient in a number of foods, particularly cereal grains, was higher than the reference protein. Other essential amino acid contents such as leucine and valine were extremely high comparing the proteins of other sources and FAO reference protein.

The organism exhibited a change when thiamine (Vitamin $B_1$) was present in the initial stages of fermentation. If grown in the absence of thiamine the organisms had a pale, light-cream color, and a relatively long log phase of growth. If yeast extract, or thiamine was added to the initial culture, the organisms developed a bright yellow color and had a relatively shorter log phase of growth.

In a representative large scale batch fermentation, neutralized, oxidized, alkali-treated cellulosic material is introduced into the fermentation chamber, air is continuously introduced, thorough agitation is effected and maintained, and an inoculum of the organism utilized is added to the fermentation chamber along with nutrient medium, typical examples of which are found in Table II below. After the cell concentration has reached the desired level (as determined by optical density measurements of the aqueous phase in the fermentation chamber), it is maintained thereat by adjusting the rate of addition of supplementary pretreated cellulose and additional nutrient medium. The temperature inside the fermentor is regulated at 25-40° C., with 30-35° C. being slightly preferred, and the pH is kept within the range 5-9. Air is continuously introduced, and thorough agitation is continuously supplied.

TABLE II.—TYPICAL NUTRIENT MEDIA

| | Component | Grams per liter of distilled water |
|---|---|---|
| Medium C | $NaNO_3$ | 0.5 |
| | $K_2HPO_4$ | 1.0 |
| | $MgSO_4$ | 0.5 |
| | $KCl$ | 0.5 |
| | $Fe(SO_4) \cdot 9H_2O$ | Trace |
| | Strip of filter paper | -- |
| | pH | 7.5 |
| Medium D | $NaCl$ | 6.0 |
| | $(NH_4)_2SO_4$ | 1.0 |
| | $KH_2PO_4$ | 0.5 |
| | $K_2HPO_4$ | 0.5 |
| | $MgSO_4$ | 0.1 |
| | $CaCl_2$ | 0.1 |
| | Yeast extract | 1.0 |
| | Strip of filter paper | -- |

In starting up the fermentor it has been found to be advantageous to add a growth promoting substance such as yeast extract in an amount of 0.005 to 0.05% based on the weight of the cellulosic material.

When the process of the present invention is operated on a batch process, the optimum residence time in the fermentor is between 2 and 4 days. If a continuous operation is employed, a residence time greater than the mass doubling time is satisfactory, and a residence time of 1.1 to 1.4 times the mass doubling time is preferable.

When the contents of the fermentor is removed (in batch processes, after the appropriate time has expired; in continuous processes, continuously after the appropriate incubation period), it is decanted or filtered or centrifuged to remove any undigested cellulose and a large portion of the lignin. The supernatant or filtrate, as the case may be, contains the microorganisms; and it may be utilized as such as a food or food supplement, or the microorganisms may be harvested by any of several techniques. Advantageously, the microorganisms are allowed to settle in a continuous thickener, the underflow of which is transmitted to a high speed centrifuge for further thickening or directly to a spray dryer for final drying. It has been found highly desirable to treat the supernatant or filtrate, as the case may be, with an aqueous solution of a fluid proton donor (such as hydrochloric or nitric acids) in an amount sufficient to bring the pH of such supernatant or filtrate to a value between about 1.5 and about 6.5, whereby subsequent thickening and final removal of water to recover and utilize the microorganisms are facilitated.

A rat growth experiment has been conducted to determine the digestibility of this protein. In a 10 day period male weanling rats of the Spraque-Dawley strain were fed ad libitum an otherwise adequate but protein-free diet or the same basal diet containing 10, 20 or 40% crude protein from the Cellulomonas species ATCC No. 21399. All rats receiving more than 20% of this protein in their diet showed a weight increase for the 10 day period, while those on the diet containing no protein supplement showed a net weight loss for the same period. No toxicity was observed at any feeding level. This demonstrates the utility of this product as an animal feed supplement.

The product from the final drying process is found to have a total nitrogen content of about 8%, as determined by Kjeldahl analysis, and a total protein content of approximately 50%. The amino acid composition of the product was found to be properly balanced, indicating a highly valuable protein. Such composition is found in Table III below. The product has shown utility as an animal food, and animal food supplement, and as a human food, and human food supplement, being entirely comestible and thoroughly digestible by land animals and humans.

The following examples, wherein all parts and percentages are to be taken by weight, illustrate the instant invention, but are not to be construed as limiting its scope.

EXAMPLE 1

Sugar can bagasse (sugar cane stalk remaining after sugar has been extracted) was ground in a Wiley mill knife cutter through a ⅛" screen. The ground material was slurried with 10% NaOH containing 5 p.p.m. CaCl₂. The bagasse was allowed to remain in the alkali slurry for from 30 to 45 min. The slurry was from 3% to 7% solids. The slurry was pumped continuously into a solid-liquid separating device which reduced the material to from 60% to 65% free water content. This material was fed into a radiant heated, continuous belt oven where air was blown onto the bagasse. The bagasse remained in the heating zone for 4 min. When the bagasse emerged from the oven free moisture content was reduced to from 35% to 45%. The temperature profile of the material in the oven started at ambient (28° C.), and was quickly raised to 100° C. where it remained throughout the remainder of its residence in the oven. The treated bagasse material emerged from the oven as dry-to-the-touch, light brown, 1/16" thick flakes.

3,880 g. of this material was charged to a 194 liter fermentation vessel. The material contained 761 g. of carbohydrate. The following nutrient salts were added to the fermenter: NaCl, 800 g.; (NH₄)₂SO₄, 194 g.;

KH₂PO₄

97 g.; K₂HPO₄, 97 g.; NaSO₄, 19.4 g.; CaCl₂, 19.4 g. This media was then brought to pH 7.0 by addition of HCl. The neutralization generated 630 g. of NaCl. This media was then raised to 100° C. for 2 hrs. by steam injection. The media was cooled and inoculated with 20 liters of Cellulomonas, sp. culture. ATCC No. 21399 grown on filter paper substrate with the nutrient solution described in Table II–D.

Continuous agitation was maintained in the fermenter especially designed with a draft-tube and air lift to maintain vigorous agitation by the introduction of air. Total run time was 96 hrs. Temperature, pH, aeration rate, soluble carbohydrate concentration, and cell density were monitored throughout the run. These data are shown below:

| Time (hrs.) | Temperature (° C.) | pH | Soluble carbohydrate (mg./l.) | Cell density (g./l.) |
|---|---|---|---|---|
| 0 | 34 | 7.0 | 658 | |
| 5.75 | 34 | 7.8 | 800 | <0.1 |
| 18.5 | 34 | 7.3 | 615 | 0.8 |
| 24.5 | 34 | 7.6 | 522 | 1.75 |
| 42.5 | 34 | 7.35 | 545 | 2.4 |
| 70.5 | 34 | 6.0 | 655 | 2.65 |
| 72.25 | 34 | 6.8 | 705 | 2.65 |
| 90.5 | 34 | 6.95 | 628 | 2.60 |
| 96 | 34 | 7.1 | 625 | 2.60 |

Analysis of the run showed that 250.1 g. of cells were produced which contained 52% protein. The following production efficiency ratios were calculated:

g. cells produced/g. carbohydrate metabolized=0.512
g. Protein produced/g. carbohydrate metabolized=0.266
g. Carbohydrate metabolized/g. carbohydrate fed=0.643
Interpretation of graphical results resulted in the following values:
Mass doubling time (log phase)=2.5 hrs.
Growth rate constant (log phase)=0.275 hr.⁻¹

The fermenter was harvested by pumping the entire contents through a plate and frame filter press where most insoluble cellulose was removed. The liquor was then brought to pH 2.6 by HCl addition and the cells formed floc and precipitated. They were removed by centrifugation. The cells were analyzed for protein content by Kjeldahl analysis, and the protein was analyzed for amino acid pattern. The amino acid profile of the protein fraction of the cells is shown in Table III.

TABLE III

Essential amino acid content of the single cell proteins harvested

| Essential amino acid: | Amount (g./100 g. protein) |
|---|---|
| Arginine | 9.21 |
| Histidine | 2.30 |
| Isoleucine | 4.74 |
| Leucine | 11.20 |
| Lysine | 6.84 |
| Methionine | 1.86 |
| Phenylalanine | 4.36 |
| Threonine | 5.32 |
| Valine | 10.71 |
| Tyrosine | 2.67 |
| Half cystine | 1.2(?) |
| Total S amino acids | 3.1 |
| Total aromatic amino acids | 7.03 |

The sample was hydrolyzed with 6 N HCl at 110° C. for 22 hours and determined with a Beckman Model 116 amino acid analyzer.

EXAMPLE 2

Whole sugar cane bagasse was chemically treated in the same manner as in Example 1.

3,870 g. of the treated material containing 774 g. carbohydrate was charged to the same fermenter as used in Example 1. The same nutrient salts, sterilization procedure, and inoculation procedure were employed as stated in Example 1.

The fermenter was run for 90.25 hrs. with a 21 liter/min. aeration rate. Samples were taken at various times and analyzed for the same data as presented in Example 1.

Following are the data obtained from this run:

| Time (hrs.) | Temperature (° C.) | pH | Soluble carbohydrate (mg./l.) | Cell density (g./l.) |
|---|---|---|---|---|
| 0 | 34 | 7.1 | 848 | <0.1 |
| 7.25 | 34 | 7.16 | 767 | <0.1 |
| 32.5 | 32 | 7.0 | 564 | 0.40 |
| 37.5 | 32 | 6.9 | 504 | 1.40 |
| 45 | 32 | 6.9 | 430 | 2.0 |
| 69.5 | 32 | 6.56 | 461 | 2.65 |
| 78.25 | 32 | 6.69 | 495 | 2.50 |
| 90.25 | 32 | 6.73 | 507 | |

Graphical analysis of this data gave the following results
Mass doubling time (log phase)=2.6 hrs.
Growth rate constant (log phase)=0.265 hr.⁻¹

EXAMPLE 3

200 mesh Solka Floc, ball-milled, purified cotton linters, was used as carbohydrate source for the same ATCC No. 21399 Cellulomonas species. 3,000 g. Solka Floc, which was essentially pure carbohydrate, was added to a 300 liter turbine agitated, air sparged fermenter. The following nutrient salts and growth promoting materials were added: NaCl, 1800 g.; (NH₄)₂SO₄, 300 g.; KH₄PO₄, 300 g.; K₂HPO₄, 300 g.; MgSO₄, 60 g.; CaCl₂, 30 g., trace minerals, 300 ml.; glucose, 150 g.; yeast extract, 30 g.

The media was sterilized at 125° C. for 30 min., and then cooled to 30° C. The media was inoculated with 6 liters of the same Cellulomonas, sp. culture prepared by growth on Solka Floc and nutrient salts as stated in Table II–D.

The fermenter was run for 89 hrs. at 30° C–34° C., pH 6.5–7.5, with agitation and air addition. The cells were harvested from the fermentation media by fractional washing and settling of the insoluble cellulose, and by fractionation in a high-speed centrifuge. Analysis of the data obtained from this run resulted in the following values:

$$\frac{\text{g. cells produced}}{\text{g. carbohydrate metabolized}} = 0.442$$

$$\frac{\text{g. protein produced}}{\text{g. carbohydrate metabolized}} = 0.240$$

$$\frac{\text{g. carbohydrate metabolized}}{\text{g. carbohydrate fed}} = 0.690$$

The cells obtained from this run were lyophilized and analyzed for crude protein content by Kjeldahl analysis. The crude protein content was 52.3%.

What is claimed is:

1. A process for the preparation of comestible, digestible protein, which process comprises cultivating cellulase-elaborating bacteria of the genus Cellulomonas in the presence of oxygen at 25°–40° C. on cellulosic material which has been pretreated to depolymerize or degrade the lignin present.

2. The process according to claim 1, wherein the cellulosic material is pretreated by oxidation in alkaline solution.

3. The process according to claim 2, wherein the pretreatment comprises:
   (a) Contacting the cellulosic material with aqueous alkali having a concentration of between about 2–50 percent by weight of the alkali; and
   (b) Heating the alkali-contacted cellulosic material in the presence of oxygen to a temperature between about 25–100° C.

4. The process according to claim 3, wherein the aqueous alkali contains from about 2 to about 500 parts by weight of cobalt (II) chloride per million parts by weight of the aqueous alkali.

References Cited

UNITED STATES PATENTS

| | | | |
|---|---|---|---|
| 2,222,885 | 11/1940 | Thomsen | 195—41 X |
| 3,462,275 | 8/1969 | Bellamy | 99—9 |
| 3,398,055 | 8/1968 | Bruno | 195—66 |
| 1,880,773 | 10/1932 | Buswell et al. | 195—9 |

OTHER REFERENCES

Fawns, H. T.: "Food Production by Microorganisms," Food Manufacture, June 1, 1943, pp. 194–200.

"Isolation and Characterization of a Cellulose Utilizing Bacterium," Applied Microbiology, vol. 16, No. 8, August 1968, pp. 1140–1145, Y. W. Han, et al.

"Producing Alkali Cellulose," by E. L. Tatevosyan et al., U.S.S.R. Pat. 179,611, Feb. 8, 1966. Cited in Chemical Abstracts, 65:2469c.

LIONEL M. SHAPIRO, Primary Examiner

R. B. PENLAND, Assistant Examiner

U.S. Cl. X.R.

99—9